March 5, 1957 R. G. PATTERSON 2,783,796
EDGE PLANERS
Filed July 21, 1955 2 Sheets-Sheet 1
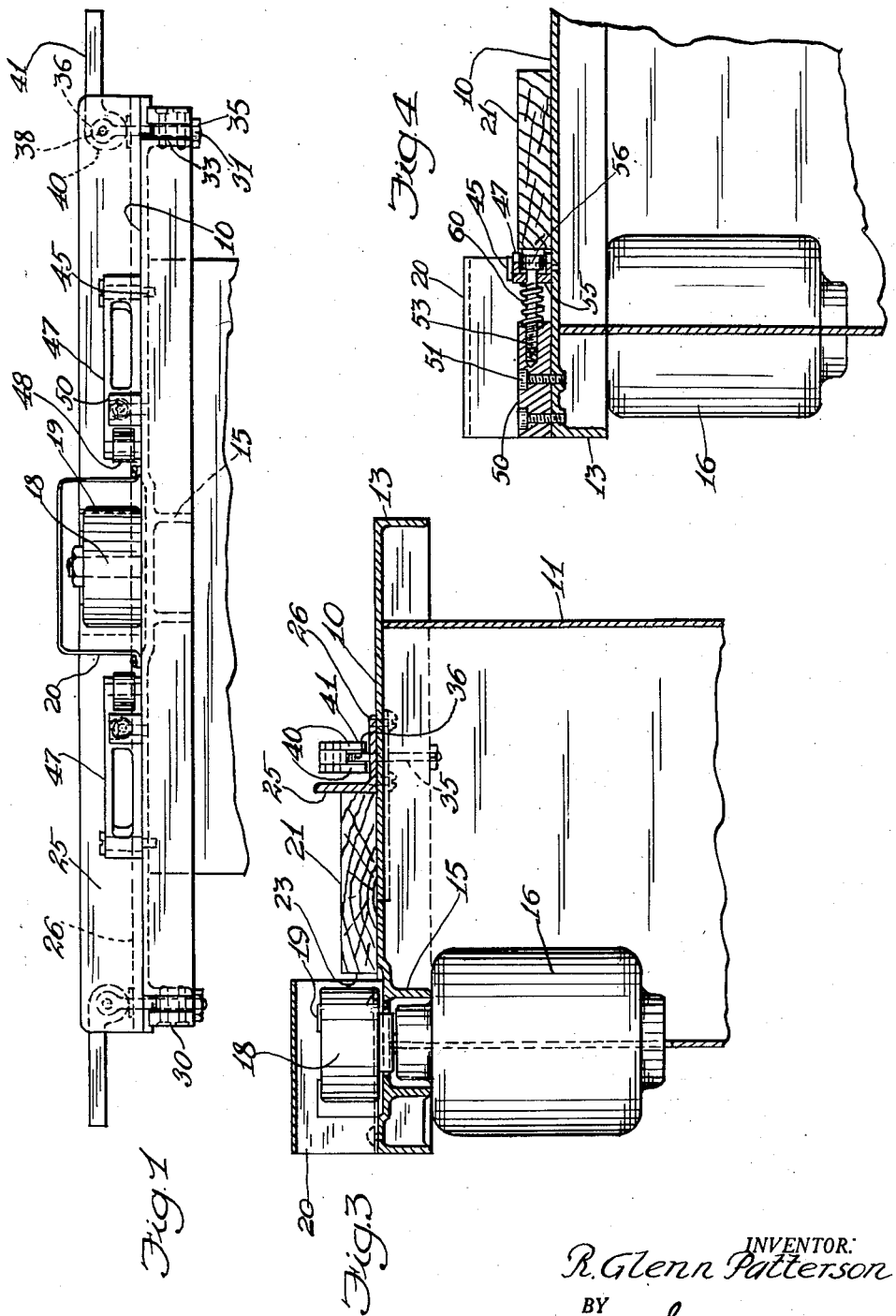
INVENTOR.
R. Glenn Patterson
BY
Milo B. Stevens & Co.
Attorneys.

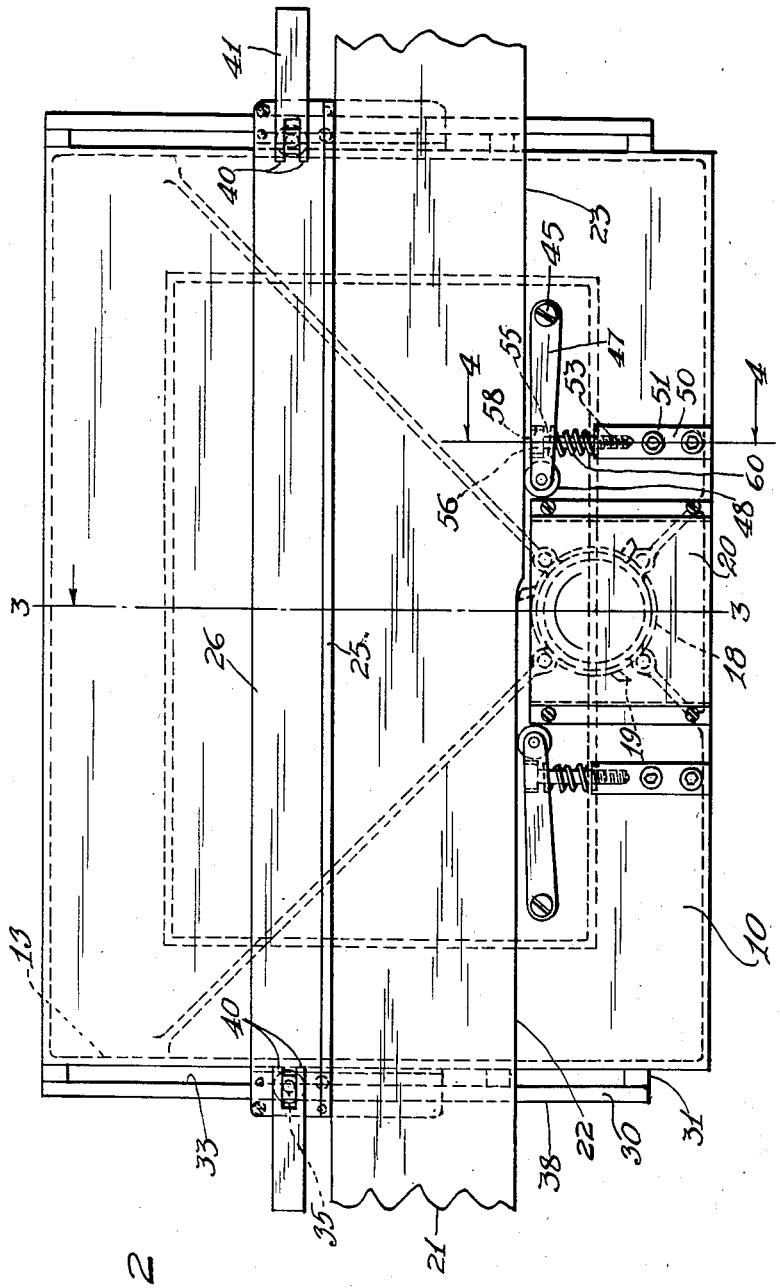

United States Patent Office 2,783,796
Patented Mar. 5, 1957

2,783,796
EDGE PLANERS
Robert Glenn Patterson, Plainfield, Ill.

Application July 21, 1955, Serial No. 523,504

3 Claims. (Cl. 144—253)

My invention relates to machines for planing the edges of wood boards. Machines of this character are employed in wood-working shops, mills, carpenter shops, etc., for finishing the edges of boards after they have been run through a bench saw. The planing operation is designed to finish the board at a required width, such as for special trim and cabinet work. Also, planing is employed to secure a first straight edge on a rough board when a shipment of rough lumber comes from the mill. Ordinarily, planing is done on a jointer, which is a large piece of equipment. It is, however, one object of the present invention to provide an independent machine for this purpose which is quite small and simple.

A further object is to design an edge planer in which the work is fed horizontally over a table, with a vertically centered cutter disposed adjacent to the path of the work.

It frequently occurs during the use of a jointer that the work is cut too deeply or mashed at the end, creating a damage in the work. It is therefore another object of the invention to provide automatic means to maintain the work in the feeding path and for the uniform operation of the planing cutter.

An additional object is to provide a cutter which is driven directly by a motor carried by the machine, eliminating belts and the factor of belt slippage.

A still further object is to provide a work guide which is simple and adjustable to various widths of the work.

With the above objects in view, a better understanding of the invention may be had by reference to the accompanying drawings, in which—

Fig. 1 is a front elevation of the edge planer, the supporting portion of the same being broken away;

Fig. 2 is a plan view;

Fig. 3 is a section on the line 3—3 of Fig. 2; and

Fig. 4 is an enlarged section on the line 4—4 of Fig. 2.

In accordance with the foregoing, specific reference to the drawings indicates the table of the planer at 10 and its support at 11. The table has a suitable marginal skirt 13 for purposes of rigidity; and it has a substructure 15 for mounting an electric motor 16 whose shaft is positioned vertically and carries a standard heavy duty cutter 18 above the table 10, the blades of the cutter being indicated at 19. A protective hood 20 is provided for the cutter.

While the cutter 18 is positioned in the frontal portion of the planer, the work—such as a board 21—is designed to be fed along the medial portion thereof over the table 10. Thus according to Fig. 2, the cutter rotates in a counter-clockwise direction; and the board 21 is therefore designed to be fed from the right toward the left in a position to have its front edge engaged by the teeth of the cutter. The same figure indicates that a portion of the cut has been made, so that the planed edge 22 is somewhat deeper than the regular edge 23 of the board.

The board is designed to be guided during its feed by a backing guide 25 which is part of an angle rail 26. Fig. 2 shows the guide positioned directly behind the board 21; and the guide is adjustable to accommodate narrower or wider boards by being moved back and forth along the table.

Means are provided for locking the guide 25 at any position to which it has been adjusted. Thus, the table 10 is supplemented endwise by external bars 30 held by spacers 31 and forming long slots 33 endwise of the table. A bolt 35 is designed to pass up through each slot 33 and an opening in the rail 26 to terminate with an eye 36 at a point above the table. The eye carries a cross-pin 38 for journaling a forked eccentric cam 40, the latter having a handle 41. When the two cam handles 41 are upright, the guide 25 is free to be slid back and forth over the table. However, when the proper position for the guide has been determined, the handles 41 of the cams may be swung outwardly to the horizontal positions indicated in the drawings, this action drawing up on the bolts 35 and clamping the rail 26 down on the table.

The automatic means for maintaining the board 21 in position along the guide 25 will now be described. On each side of the cutter zone, the table receives a screw 45 as a pivot for an inwardly extending arm 47, the inner end of the arm journaling a roller 48. The table supports a plate 50 secured by screws 51 and forming a bearing for a screw 53 directed toward the frontal side of the arm 47. The screw 53 freely enters an aperture in a web 55 of the arm 47 and terminates with a head 56 inside a cavity 58 in the outer portion of the arm. The screw 53 carries a compression spring 60 between the arm 47 and the plate 50. The rollers 48 are thus urged to engage the edges 22 and 23 of the board 21 by the pressure of the springs 60 and maintain the board in contact with the guide 25 throughout the course thereof.

It will now be apparent, when a length of board has been inserted in the novel planer for a cutting operation, that its position may be fixed by the proper adjustment of the backing guide 25. Also, the pressure units over the frontal region of the table will automatically urge the board into even contact with the backing guide 25, so that the only attention to the planing operation is the manual feed of the board. The uniform travel thereof insures a clean planing cut throughout, so that the end portions of the board are even with the medial portion thereof. The novel planer also has the advantages of compactness and simplicity; and the mounting of its motor imparts a direct drive to the planing cutter, eliminating the need of pulleys and belts and the factor of belt slippage. The pressure units alongside the cutter zone are constructed according to well established mechanical principles, and may be adjusted as desired by turning the screws 53 and depended upon to serve efficiently for an indefinite period of time. In conclusion, it may be said that a machine of the character described may be built for a fraction of the cost of conventional planing equipment.

While I have described the invention along specific lines, various minor changes or refinements may be made therein without departing from its principle, and I reserve the right to employ all such changes and refinements as may come within the scope and spirit of the appended claims.

I claim:

1. An edge planer comprising a table designed to receive the work, a guide for the rear edge of the work for feeding the same along a prescribed course, a cutter positioned opposite the frontal edge of the work, and means to urge the work into uniform contact with said guide during the feeding course of the work, said means comprising a pair of rollers on opposite sides of the cutter zone, and a yieldable element for each roller urging the same toward the frontal edge of the work.

2. An edge planer comprising a table designed to receive the work, a guide for the rear edge of the work for feeding the same along a prescribed course, a cutter positioned opposite the frontal edge of the work, and means to urge the work into uniform contact with said guide during the feeding course of the work, said means comprising a pair of arms on opposite sides of the cutter zone, each arm being pivoted at one end on the table, a roller carried by the other end of the arm opposite the frontal edge of the work, and a yieldable element urging the arm toward such frontal edge.

3. An edge planer comprising a table designed to receive the work, a guide for the rear edge of the work for feeding the same along a prescribed course, a cutter positioned opposite the frontal edge of the work, and means to urge the work into uniform contact with said guide during the feeding course of the work, said means comprising a pair of arms on opposite sides of the cutter zone, each arm being pivoted at one end on the table, a roller carried by the other end of the arm opposite the frontal edge of the work, a yieldable element urging the arm toward such frontal edge, said yieldable element comprising a bearing carried by the table, a horizontal screw threaded in the bearing and directed into linking engagement with the arm, and a spring between the latter and the bearing.

References Cited in the file of this patent
UNITED STATES PATENTS

| | | |
|---|---|---|
| 363,016 | Stalter | May 17, 1887 |
| 481,983 | Thom | Sept. 6, 1892 |
| 1,370,895 | Loomis | Mar. 8, 1921 |
| 2,699,804 | Starnes | Jan. 18, 1955 |
| 2,722,247 | Schroeder et al. | Nov. 1, 1955 |

FOREIGN PATENTS

| | | |
|---|---|---|
| 371,489 | Germany | Mar. 16, 1923 |
| 976,303 | France | Oct. 25, 1950 |